United States Patent [19]

Tanaka

[11] Patent Number: 5,166,666
[45] Date of Patent: Nov. 24, 1992

[54] PEN OPERATED PROCESSING SYSTEM WITH SPEED-RESPONSIVE SWITCHING

[75] Inventor: Hidekazu Tanaka, Tokyo, Japan

[73] Assignee: Sony Corporation, Tokyo, Japan

[21] Appl. No.: 715,927

[22] Filed: Jun. 14, 1991

[30] Foreign Application Priority Data

Jun. 14, 1990 [JP] Japan .................. 2-156671

[51] Int. Cl.[5] .............................. G09G 3/02
[52] U.S. Cl. ....................... 340/706; 382/13; 340/723
[58] Field of Search ............ 340/706; 382/13, 14, 382/16, 48, 61, 3, 706, 707, 709, 721, 723

[56] References Cited

U.S. PATENT DOCUMENTS 4,972,496 12/1990 Sklarew ................... 178/18
5,049,862 9/1991 Dao et al. ................ 340/706

FOREIGN PATENT DOCUMENTS 0254581 1/1988 European Pat. Off. .

OTHER PUBLICATIONS

"A Taxonomy of Window Manager User Interfaces", IEEE Computer Graphics and applications, Sep. 1988, pp. 65-84.

Primary Examiner—Jeffery A. Brier
Assistant Examiner—A. Au
Attorney, Agent, or Firm—Hill, Van Santen, Steadman & Simpson

[57] ABSTRACT

In an information processing system in which predetermined information is processed on the basis of coordinate data x, y, the coordinate data x, y is inputted through a coordinate inputting means such as a pen and tablet arrangement. Inputted loci are detected by sequentially accepting the coordinate data x, y. The processing mode of the information processing system is switched according to the configuration of the inputted loci. By switching the processing mode in response to the configuration of the inputted loci, the operation mode can be switched. For example, by moving the pen on the tablet in a jumped or reversed direction manner, the processing mode such as storing of a window can be effected.

7 Claims, 6 Drawing Sheets

PEN OPERATED PROCESSING SYSTEM WITH SPEED-RESPONSIVE SWITCHING

BACKGROUND OF THE INVENTION

1. Field of the Invention

The present invention relates to information processing apparatus, for example an information processing apparatus which is operable to process predetermined information on the basis of coordinate data inputted from a tablet, for example.

2. Description of the Prior Art

In this type of information processing system, it has previously been proposed to control entry of and changes to various kinds of personal information, such as address book, telephone directory and schedule table, in a similar manner to a pocket book. Such systems are disclosed in U.S. patent application Ser. No. 621 898 having a common assignee and in the present assignee's Japanese Patent Application No. 2 (1990)-84318.

Figure 1:
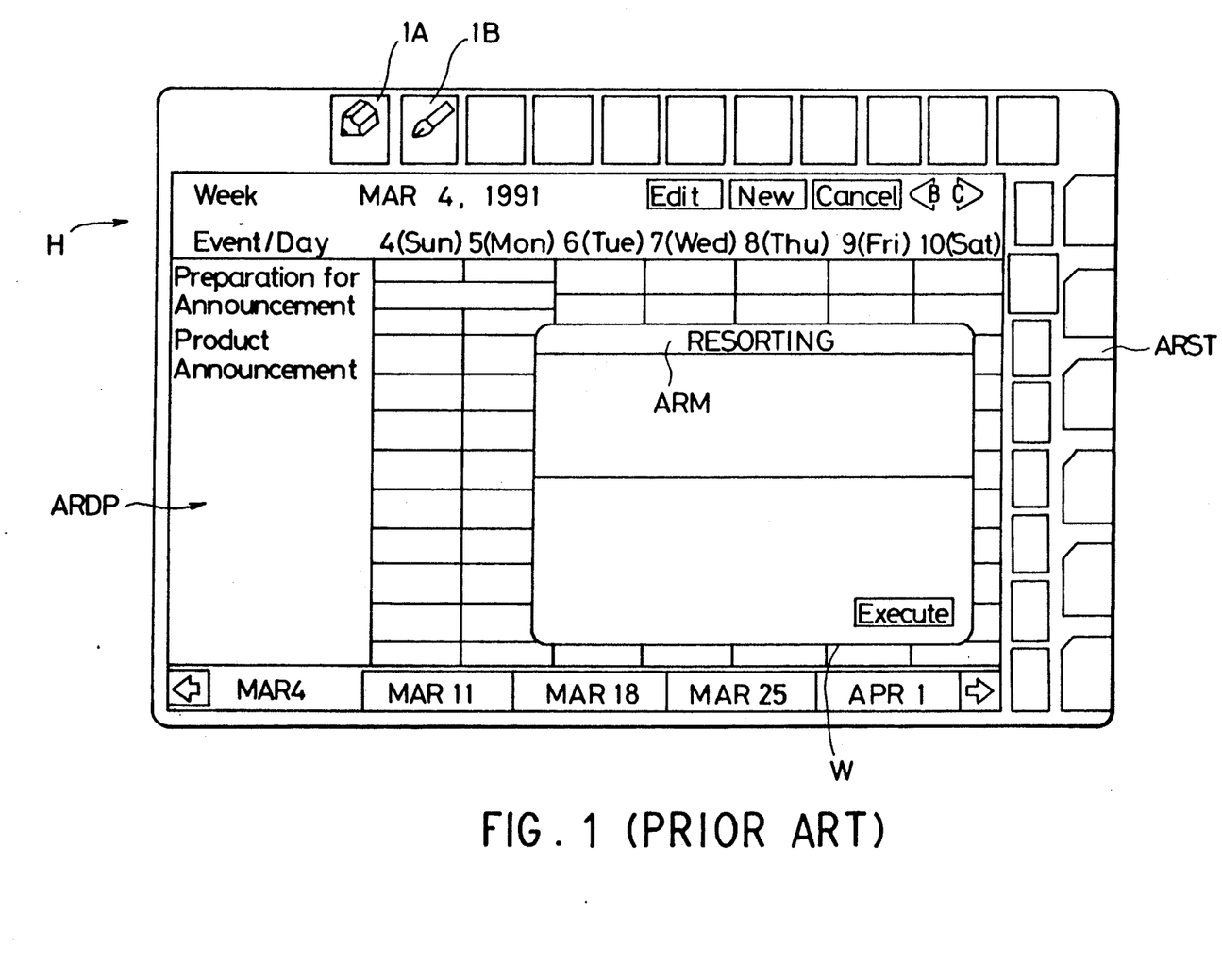
FIG. 1 is a schematic diagram showing the image on a display screen of a previously-proposed information processing system.

In such an information processing system, the display screen H is switched according to the user's selection operation as illustrated in FIG. 1 of the accompanying drawings, and icons 1A, 1B, . . . are displayed at the upper margin and the right hand margin of the display screen H.

The user pens down the pen (not shown) on a required icon 1A, 1B, . . . , and then the pen is moved to a predetermined position on the display screen H. This causes a window W which corresponds to the selected icon to be displayed at the traveled position, and according to an indication within the window, personal information such as a schedule can be controlled. As used herein, the verb "pen" means to make contact between the pen and the display screen.

In this kind of information processing system, the user may wish to change the display position of the window W. Also, the user may wish to store the displayed window W.

In the latter case, the pen is penned down on a predetermined area ARM of the window W, and then it is moved to the display area ARST (hereinafter referred to as standby area) of the icons 1A, 1B, . . . , where the pen is penned up, causing the window W to be stored.

On the other hand, when the pen is penned up within an area ARDP (hereinafter referred to as display area of the page data) in the display screen H except for the standby area ARST, the window W is moved to the position at which the pen has been penned up.

For this reason, it is necessary for the user to repeat the complex operation to move the pen to the standby area ARST for storing the window W, and hence the information processing system is relatively complicated to use.

One technique to alleviate this problem would be to enlarge the standby area ARST, but the larger the standby area ARST, the smaller the display area ARDP of the page data. Thus, personal information would have to be displayed in a smaller display area.

Alternatively, a window storing instruction icon might be displayed within the window W, but this technique is not practical since the display area within the window W is reduced by the area within the window W on which the icon is displayed.

SUMMARY OF THE INVENTION

In view of the foregoing, an object of this invention is to provide an information processing apparatus which is capable of improving facility of use compared to the previously-proposed system.

According to one aspect of the invention there is provided an information processing apparatus comprising:

coordinate information input means for inputting coordinate data;

processing means for processing said coordinate data;

detecting means for detecting a trace pattern of said input coordinate data in a sequential manner; and switching means for switching a mode of said apparatus according to detection of said trace pattern by said detecting means.

According to another aspect of the invention there is provided an information processing apparatus comprising:

pen means for inputting coordinate information;

tablet means for generating coordinate data based on said coordinate information input by said pen means on said tablet means;

display means for displaying a trace pattern according to said coordinate data, said display means being placed under said tablet means such that an image displayed on said display means is visible through said tablet means; and control means for receiving said coordinate data sequentially and processing said coordinate data;

wherein when said control means detects a predetermined trace pattern according to said coordinate data, the mode of a first condition of said control means is changed to second condition.

In the preferred information processing apparatus, predetermined information is processed on the basis of coordinate data x, y inputted through coordinate inputting means, inputted loci are detected by sequentially accepting the coordinate data x, y, and the processing mode is switched according to the configuration of the inputted loci.

By switching the processing mode in response to the configuration of the inputted locus, the operation mode can be switched, for example by moving a pen in a jumped or reverse direction manner.

As described, embodiments of the present invention are capable of switching the processing mode with ease according to requirements by switching the mode on the basis of the configuration of the inputted locus, and hence are capable of providing information processing systems with improved facility.

The above, and other objects, features and advantages of this invention will be apparent from the following detailed description of illustrative embodiments which is to be read in connection with the accompanying drawings, in which like parts are designated by like reference numerals or characters.

BRIEF DESCRIPTION OF THE DRAWINGS

In the accompanying drawings:

FIG. 4 (formed of FIGS. 4A and 4B) is a flow diagram illustrating the operation of the embodiment of FIG. 3.

DETAILED DESCRIPTION OF EMBODIMENTS OF THE INVENTION

Figure 2:
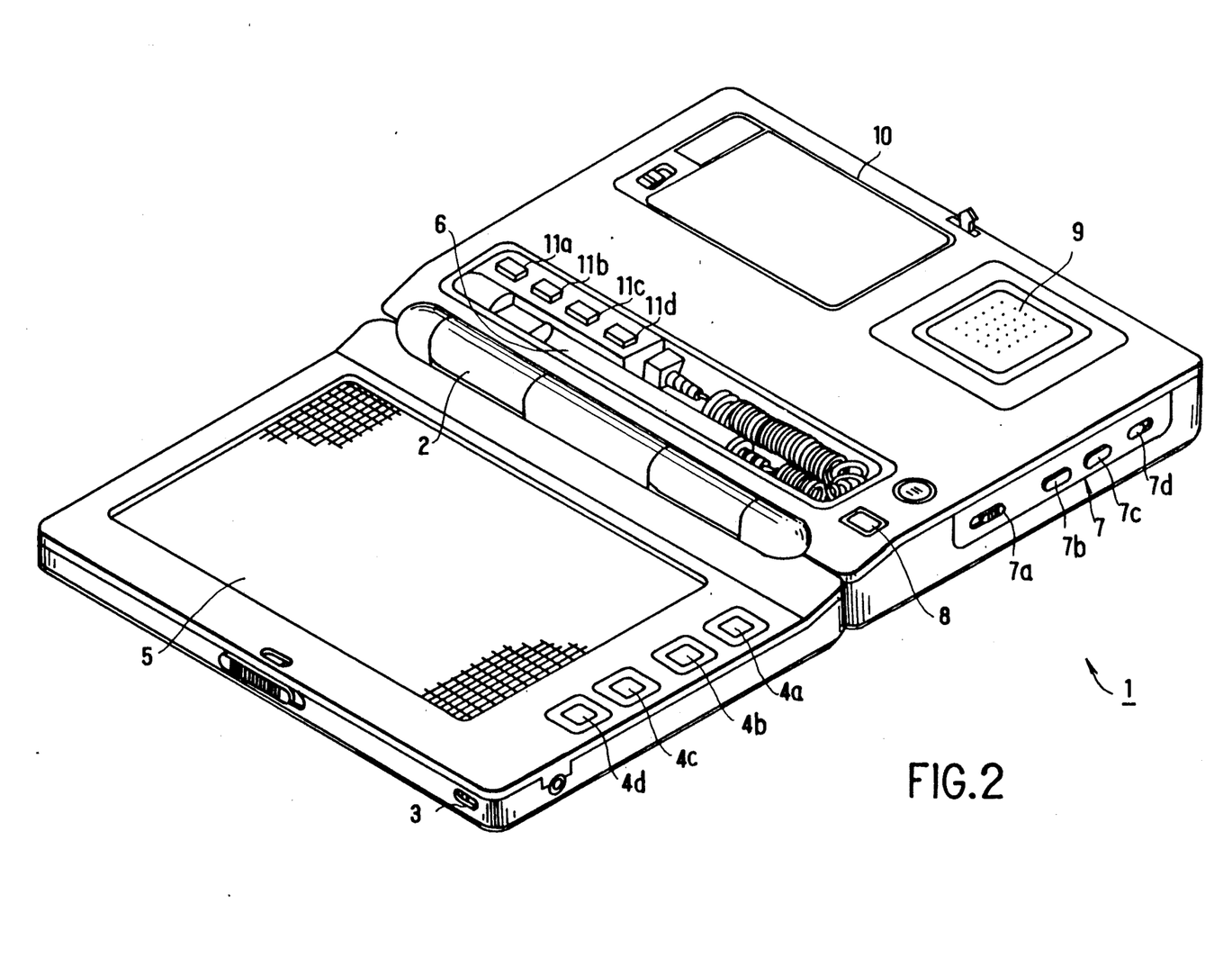
FIG. 2 is a perspective view of an information processing system.

Preferred embodiments of this invention will now be described with reference to the accompanying drawings:

(1) One embodiment (1-1) Overall configuration of the information processing system In FIG. 2, there is shown an information processing system 1 which is made portable by arranging casings A and B to be foldable by means of a hinge 2.

The casing B is provided at its front with a microphone 3, by means of which voice messages can be inputted.

On the upper surface of the casing B, there are arranged key switches 4a to 4d, by which operation of the information processing system 1 can be switched according to requirements.

A liquid crystal display panel 5, which has a transparent static capacity type tablet mounted on it, is arranged in the casing B. It is possible to display desired personal information through the liquid crystal display panel 5 as well as graphics matter such as windows and icons.

A pen 6, which can be stored in a recess in the casing A when not in use, is penned down on the tablet as a result of which coordinate data is inputted through the tablet. This enables display positions of windows to be switched and the personal information to be controlled according to requirements on the basis of the coordinate data.

The casing A is provided at its right side edge with actuating elements 7, which may consist of a recording actuating element 7a, a reproduction actuating element 7b, a stop actuating element 7c and a volume adjustment actuating element 7d; by operating the actuating elements 7, a voice which has been picked up by the microphone 3 can first be recorded and then reproduced.

On the upper surface of the casing A, there is arranged a loudspeaker 9 as well as a power switch 8, and by means of this loudspeaker 9, the voice which has been picked up by the microphone 3 may be monitored. In addition, by placing the mouthpiece of a telephone against the loudspeaker 9, personal information may be transmitted along the telephone line.

Furthermore, on the upper surface of the casing A, there are arranged key switches 11a to 11d in addition to an electric cell receiving portion 10. In addition to the key switches 4a to 4d, these further key switches 11a to 11d enable the operation of the information processing system 1 to be switched according to requirements.

Figure 3:
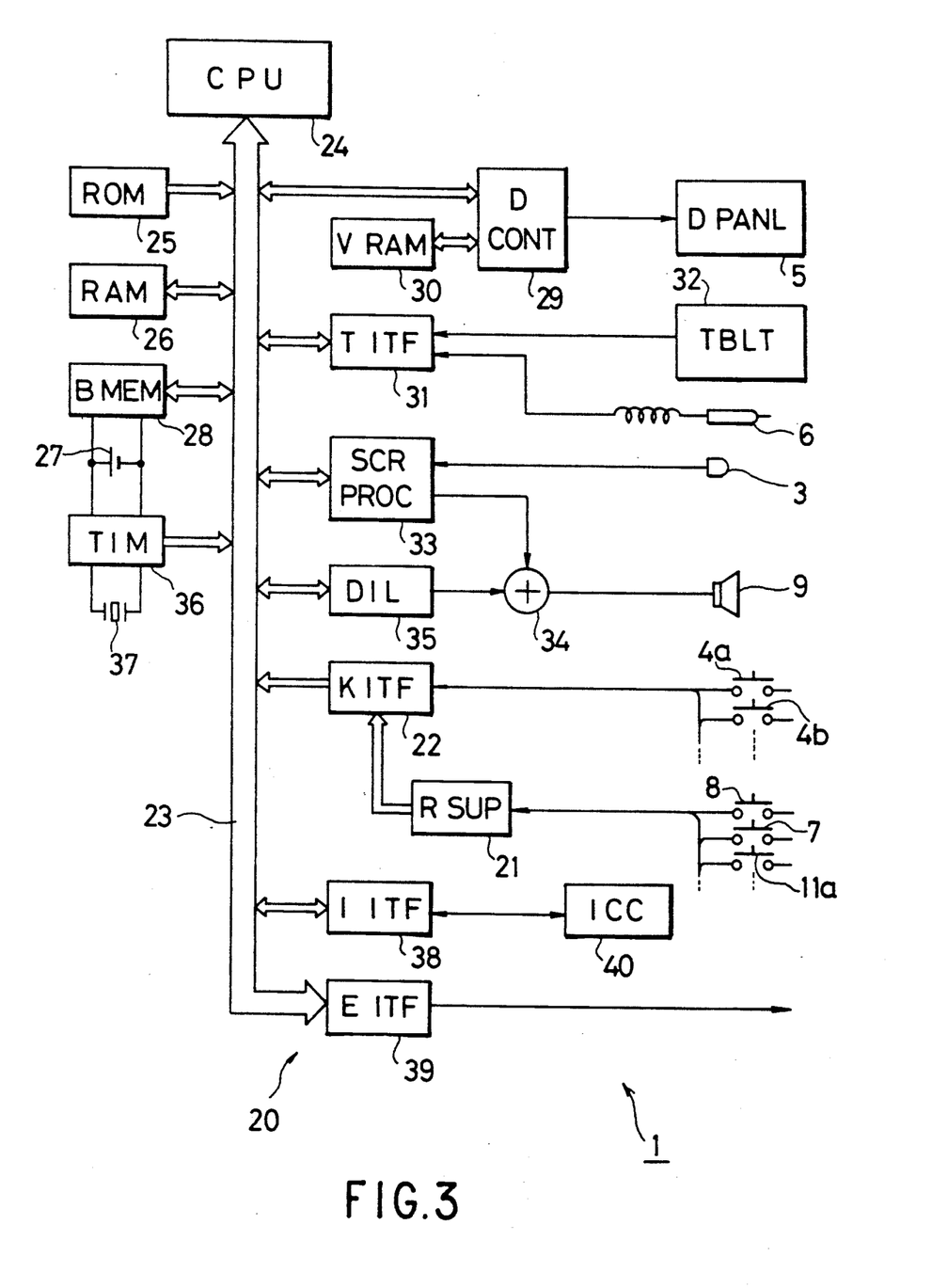
FIG. 3 is a schematic block diagram showing a signal processing part which can perform window storing according to one embodiment of the present invention.

In a signal processing circuit of the information processing system 1 as shown in FIG. 3, the power switch 8, the actuating elements 7 and the key switches 11a to 11d are connected to a power supply circuit 21, and this enables the information processing system 1 to be turned on by switching the power switch 8 on.

When the actuating elements 7 and the key switches 11a to 11d are activated in addition to the power supply operation, the power supply circuit 21 sends control data to a key interfacing circuit 22.

The key interfacing circuit 22 sends out the control data, which has been sent from the power supply circuit 21, to a central processing unit (CPU) 24 through a bus 23, and the operation of the information processing system 1 is switched as a result.

The key interfacing circuit 22 sends out the control data in a similar manner in the case when the key switches 4a to 4d are turned on, so that the operation of the information processing system 1 is switched in response to the on operation of the key switches 4a to 4d.

The CPU 24 can access a read only memory (ROM) 25 and a random access memory (RAM) 26 through the bus 23, and the processing program of the ROM 25 is executed thereby in response to the operation of the actuating elements.

In this event, the CPU 24 can renew personal information stored in a backup memory circuit 28 or may register it in the backup memory circuit 28 by accessing the latter, the backup memory circuit 28 being connected to a backup cell 27. The personal information is displayed on the liquid crystal display panel 5 as required.

More specifically, the CPU 24 outputs personal information, which has been accessed according to a processing mode, to a display controller 29, and thereby renews the contents of a video memory circuit (V-RAM) 30, so that the display on the liquid crystal display panel 5 is renewed.

Furthermore, the CPU 24 reads in coordinate data of the pen 6, when penned down on a tablet 32, through a tablet interface circuit 31, and is operable to move a window, for example, to the penned up position or to store the window.

This causes the operation mode of the information processing system 1 to change, for example to switch to a mode of the schedule as described with reference to FIG. 1, and if necessary, a predetermined window W can be displayed by moving the pen 6 along the surface of the tablet 32 to a desired position after the pen 6 is penned down on an icon.

The CPU 24 may also control a solid state component record processing circuit 33 according to the control data outputted from the key interfacing circuit 22, as a result of which a voice message picked up by the microphone 3 is recorded in the backup memory circuit 28 and, if necessary, reproduced from the loudspeaker 9 through an adder circuit 34.

The CPU 24 additionally controls a dialer circuit 35 which generates dual tone signals of the so-called push phone dialing system to the loudspeaker 9 through the adder circuit 34 on the basis of phone number information which is included in the stored personal information.

The CPU 24 is also provided with time information from a timer 36 which is maintained actuated by the backup cell 27 with reference to a crystal resonator 37, and thus personal information, such as the schedule, can be controlled with reference to the time information.

The bus 23 is connected to an integrated circuit (IC) card interface circuit 38 and an extension interface circuit 39. This enhances the processing capacity of the information processing system 1 by allowing an IC card 40 to be connected to the IC interface circuit 38, and enables modem communication through the extension interface circuit 39 according to requirements.

(1-2) Storing of Windows

Figure 4A:
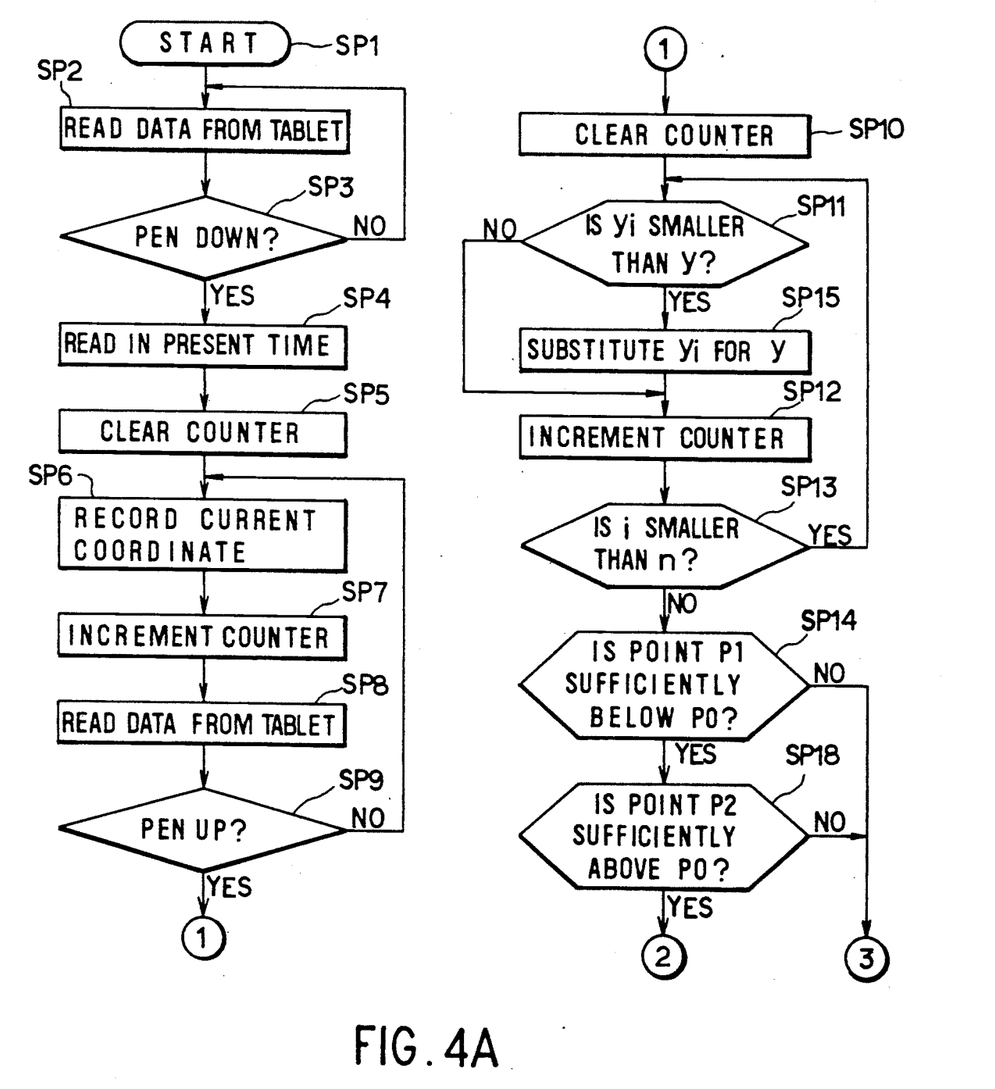
Figure 4B:
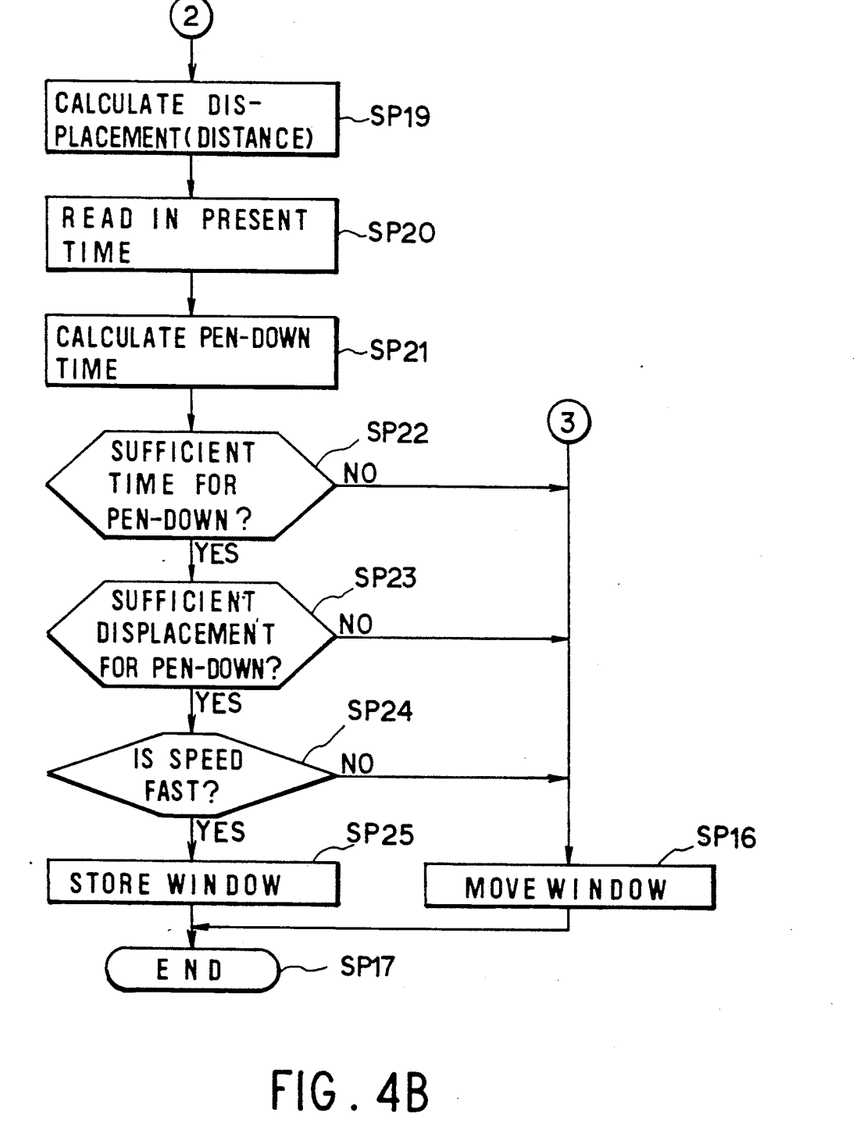

In this embodiment, the CPU 24 executes the routine shown in FIG. 4 starting by displaying a window W, and then moving the window W or storing the window W according to requirements.

More specifically, the CPU 24 moves from a "start" step SP1 to a step SP2 in which coordinate data is read in from the tablet interface circuit 31 thereby to detect the coordinate data of the pen 6.

The CPU 24 then proceeds to a step SP3 which judges according to the output data from the tablet interface circuit 31 whether or not the pen 6 is penned down, that is, whether the pen 6 is in contact with the tablet 32.

When a negative result is given in the step SP3, the CPU 24 returns to the step SP2, and then the loop of the steps SP2-SP3-SP2 is repeated until the pen 6 is penned down.

However, when the pen 6 is in fact penned down, an affirmative result is provided in the step SP3, and thus the CPU 24 goes to a step SP4 in which the present time from the timer 35 is read and recorded. Then, the CPU 24 proceeds to a step SP5 and clears a counter.

Subsequently, the CPU 24 goes to a step SP6 in which the current coordinate data x0 and y0 which have been read in the step SP2 are recorded as coordinate data at the counter value n=0.

Then, the CPU 24 proceeds to a step SP7 in which the value of the counter is incremented to renew the counter value n, and thereafter proceeds to a step SP8.

In the step SP8, the CPU 24 accepts coordinate data from the tablet interface circuit 31, and thus the coordinate data at the counter value n (in this event n=1) is read in. Then, the CPU 24 goes to a step SP9, in which it is judged whether or not a pen-up operation has been carried out.

When a negative result is obtained in this step, the CPU 24 returns to the step SP6. Thus, the loop of the steps SP6-SP7-SP8-SP9-SP6 is repeated until pen-up is performed. As the counter value n is counted up, the coordinate data x0 and y0, x1 and y1, ... are sequentially read in, and the locus of the pen 6 is then detected by the coordinate data x0 and y0, x1 and y1, ... (etc).

When pen-up has taken place, an affirmative result is obtained in the step SP9, and thus the CPU 24 goes to a step SP10 which clears the counter and then goes to a step SP11.

In the step SP11, the CPU 24 stores in a register the coordinate data y on the y axis for the pen-up operation, and then it is judged whether or not the coordinate data y0 on the y axis at the counter value 0 is larger than the coordinate data y in the register.

When a negative result is obtained in this step, the CPU 24 goes to a step SP12 in which the counter is incremented, and then in a step SP13 it is judged whether or not the incremented counter value i is less than the counter value n at the time when the pen-up was carried out.

When an affirmative result in obtained in the step SP13, the CPU 24 returns to the step SP11 in which it is judged whether or not the coordinate data yi on the y axis at the incremented counter value i is greater than the coordinate data y in the register.

Figure 5:
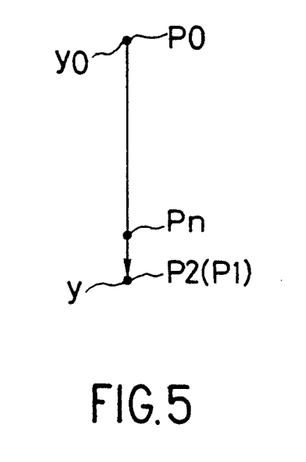
FIGS. 5 to 8 are schematic diagrams illustrating the window storing operation of the embodiment of FIG. 3.

As shown in the example of FIG. 5, after the pen 6 is penned down at a point P0, the pen is continuously moved in the negative direction of the y axis, and is then penned up at a point P2. In this case, in the step SP11, negative results are consecutively obtained, and thereby the CPU 24 repeats the loop of the steps SP11-SP12-SP13-SP11.

In this case, in the step SP13, a negative result is obtained at a point Pn just before the point P2, and hence the CPU 24 goes to a step SP14, maintaining the coordinate data in the register at the coordinate data y at the point P2 where the pen-up was carried out.

This causes the CPU 24 to detect consecutively the locus of the pen 6, and to hold the smallest negative coordinate data y in the register.

Figure 6:
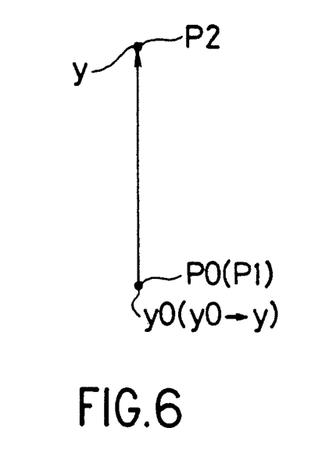

On the other hand, as shown in the example of FIG. 6, the pen 6 might be continuously moved in the positive direction of the y axis and be penned up at a point P2 after being penned down at a point P0. In this case, regarding the coordinate data y0 of the point P0, an affirmative result is obtained in the step SP11, and thus the CPU 24 goes to a step SP15.

Here, the CPU 24 sets the coordinate data y in the register to the coordinate data of the counter value (in this event, the coordinate data y0 at the point where penning-down takes place), and then proceeds to the step SP12.

This causes the CPU 24 to renew the coordinate data in the register, and then to repeat the loop of the steps SP11-SP12-SP13-SP11. In this loop, the locus of the pen 6 is consecutively detected as in the case when the pen 6 is continuously moved in the negative direction, and the CPU 24 goes to the step SP14 with the smallest coordinate data being held in the register.

Figure 7:
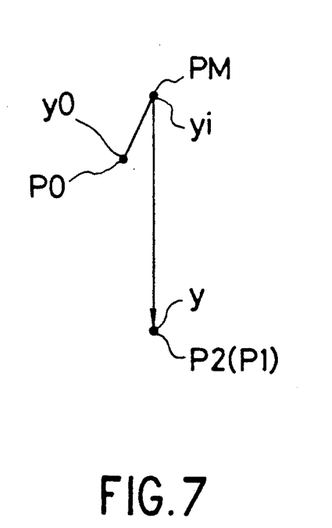

Similarly, as illustrated in the example of FIG. 7, the pen 6 may be penned down at a point P0, and may then be turned (change in direction) at a point PM after the pen has been continuously moved in the positive direction of the y axis. Thereafter, the pen 6 may be penned up at a point P2. In this case, the loop of the steps SP11-SP12-SP13-SP11 is repeated, and the CPU 24 proceeds to the step SP14 with the coordinate data y in the register being held at the coordinate data of a point P2 at which pen-up takes place. The result is that the lowest negative coordinate data y is held in the register.

Figure 8:
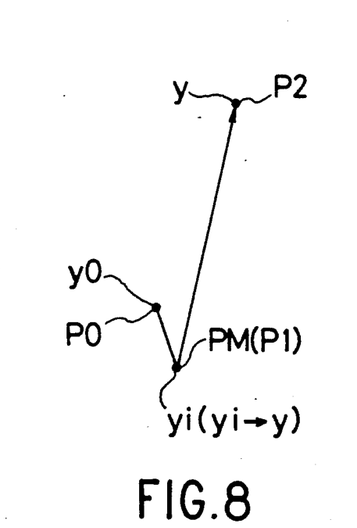

On the other hand, as shown in the example of FIG. 8, after the pen 6 is penned down at a point P0, it might be continuously moved in the negative direction of the y axis, turned at a point PM, and finally penned up at a point P2. In this case, the loop of the steps SP11-SP15-SP12-SP13-SP11 is repeated between the points P0 and PM, and this causes the coordinate data of the register to be consecutively renewed to coordinate data yi at the counter value i.

Furthermore, in the portion from the point PM to the point P2, the loop of the steps SP11-SP12-SP13-SP11 is repeated, and the CPU 24 proceeds to the step SP14 with the coordinate data yi at the turning point PM being held in the register.

Thus, in the CPU 24 the locus of the pen 6 is consecutively detected, and the lowest coordinate data is held in the register.

In the step SP14, the CPU 24 judges whether or not the point P1 of the coordinate data y stored in the register is a sufficient distance from the point P0 (at which pen-down takes place) on the negative side of the y axis.

This judgement is made according to whether or not the coordinate data y stored in the register satisfies the following condition:

$$y0-y>5(mm) \tag{1}$$

When a negative result is obtained here, the CPU 24 goes to a step SP16 in which the window W is moved to the point P2 at which pen-up occurred, and then goes to a step SP17 to complete the routine.

When the pen 6 is continuously moved as previously described with reference to FIGS. 5 and 6, a negative result is thus obtained in the step SP14, and hence the displacement processing of the window W is executed.

As described with reference to FIG. 7, after having been penned down at the point P0, the pen 6 may be continuously moved in the positive direction of the y axis, turned at the point PM, and lastly penned up at the point P2. In this case, the coordinate data of the point P2, at which the pen is penned up, is held in the register, and thus a negative result is obtained in the step SP14, so that the displacement processing of the window W is executed.

On the other hand, as described in FIG. 8, the pen 6 may be continuously moved in the negative direction of the y axis after having been penned down at the point P0. Then, the pen is turned at the point PM, and is penned up at the point P2. In this case, the coordinate data of the turning point PM is held in the register, and hence an affirmative result is obtained in the step SP14. Thus, the CPU 24 proceeds to a step SP18.

It is the intention that, under these circumstances, the CPU 24 should sequentially execute the following steps for storing the window W, such that the window W is stored by moving the pen 6 in a jumped (reversed direction) fashion.

Thus, the window W can be stored by merely operating the pen 6 to jump or change direction after being penned down, without repeating complicated operations to move the pen to the standby area ARST, as in the previous proposal. This enables the operation of storing windows to be simplified, so that the use of the windows is improved.

In practice, the operation of changing the direction of the pen 6 is found to be a natural way of erasing the windows W from the display screen, as compared to the previously-proposed operation of having to move the pen 6 to the standby area ARST.

Thus, the storing of windows W in such a manner not only simplifies the operation but also significantly enhances the facility of this operation compared to the previous technique, and hence the practicality of the information processing system 1 is improved considerably.

Moreover, it is not necessary to display the standby area ARST in the display of the windows W, and hence the display area ARDP of the page data can be enlarged by omitting the display of the standby area ARST. This further enhances the facility of the information processing system 1.

Users who are not familiar with the operation of the tablet 32 may slightly vibrate the pen 6 when the pen is penned down, and as a result, a zigzag locus of the pen 6 would be detected.

Moreover, after the pen is penned down to store a window W, the user may change his mind.

In another case, the coordinate data can change due to noise arising from environmental conditions.

In such cases, the information processing system 1 would have degraded performance when storing windows W.

In order to overcome this, in the step SP18, the CPU 24 makes a judgement as to whether or not the penned up point P2 is a sufficient distance from the point P0 in the positive direction.

This judgement is carried out according to whether or not the following condition is satisfied:

$$yup - y0 > 20 (mm) \quad (2)$$

where yup represents the coordinate data of the penned up point P2. When a negative result is obtained here, the CPU 24 goes to the step SP16 in which the window W is moved to the position at which the pen is penned up, and finally proceeds to the step SP17 to terminate the routine.

The CPU 24 thus moves the window W to a pen-up position when the distances between P0 and P1 and/or between P0 and P2 are less than the predetermined values in the steps SP14 and SP18, respectively, whereas the CPU 24 goes to a subsequent step SP19 when the distances between P0 and P1 and between P0 and P2 are larger than the predetermined values.

This prevents the window W from being stored when the user erroneously performs pen-down or when the locus of the pen is misdirected or vibrated.

In the step SP19, the CPU 24 executes the following equations:

$$X = \sum_{i=1}^{n} (|xi - x(i-1)|) \quad (3)$$

$$Y = \sum_{i=1}^{n} (|yi - y(i-1)|) \quad (4)$$

and thereby detects the displacements x and y of the pen 6 after pen-down and before pen-up.

Subsequently, the CPU 24 goes to a step SP20 in which the pen-up present time tup is read in. Then the CPU 24 proceeds to a step SP21 in which the time $\Delta t$ from pen-down to pen-up of the pen 6 is detected.

Subsequently, the CPU 24 goes to a step SP22 at which it judges whether or not the following condition is satisfied:

$$\Delta t > 0.1 (sec) \quad (5)$$

and thereby judges whether or not the time $\Delta t$ between pen-down and pen-up is sufficient. When a negative result is obtained in the step SP22, the CPU 24 goes to the step SP16.

Thus, the CPU 24 prevents the window W from being stored in the case where the user erroneously pens down and then quickly pens up, for example.

On the other hand, when an affirmative result is obtained in the step SP22, the CPU 24 goes to the step SP23 in which it is judged whether or not the displacements X and Y during the time between pen-down and pen-up meet the following equation:

$$|X| + |Y| > 20 (mm) \quad (6)$$

and thereby it is judged whether or not the displacement of the pen 6 is sufficient. Specifically, the displacement may be considered short, for example, in the case where the user changes his mind to store the window W. For this reason, the CPU 24 goes to the step SP16 when a negative result is obtained in the step SP23. In the step SP16, the window W is moved to the pen-up position without storing the window W, and then the CPU 24 proceeds to the step SP17 and terminates the routine, as previously described.

On the other hand, when an affirmative result is obtained in the step SP23, the CPU 24 goes to a step SP24, and executes the following equation for detecting the average travel speed v of the pen 6 between pen-down and pen-up:

$$v = \frac{|X| + |Y|}{\Delta t} \quad (7)$$

Furthermore, the CPU 24 judges whether or not the travel speed v satisfies the following condition:

$$v > 100 \text{(mm/sec)} \quad (8)$$

As a result, when the travel speed v of the pen 6 is slow, namely it does not satisfy the condition (8), the CPU 24 goes to the step SP16, in which the window W is moved, and then proceeds to the step SP17 for terminating the routine.

On the other hand, if the travel speed v of the pen 6 is sufficiently fast, an affirmative result is obtained in the step SP24, and thus the CPU 24 goes to the step SP25 in which the window W is stored. The CPU 24 proceeds to the step SP17 to terminate the routine.

It has been arranged that, in the case where the pen 6 is moved in a jumped or reverse direction manner, the travel speed v is generally considered sufficiently fast.

Accordingly, the window W is stored with reference to not only the case where the locus of the pen 6 is turned or reversed, but also depending on the travel speed, and thereby the window W is positively stored only when the user wishes this to occur.

(1-3) Operation of the embodiment

In the information processing system 1 with the foregoing construction, the operation mode thereof is selected by turning on a corresponding one of the key switches 4a to 4d and 11a to 11d, whereupon the desired personal information is displayed on the display panel 5.

In this state, the pen 6 is penned down on a predetermined icon, and is then moved to the display area ARDP, so that the window W derived from that icon is displayed at the position to which the pen 6 has been moved.

When the pen 6 is moved with a sufficient reversed direction or jump after it has been penned down on a predetermined area ARM of the window W, the CPU 24 sequentially executes the steps SP14-SP18-SP19-SP20-SP21-SP22-SP23-SP24-SP25-SP17, and thereby a sufficiently large turning or reversal of the locus of the pen 6 is detected and the window W is stored.

On the other hand, when the pen 6 is merely moved under conditions insufficient to be detected as a required window storing action, for example, the step SP16 is executed and the window W is moved to the pen-up position.

(1-4) Advantageous effects of the embodiment

According to the above-described construction, the operation mode is switched on the basis of the locus of the pen 6, and in the case when the locus of the pen 6 is significantly turned or reversed, the window W is stored. This enables the previously-proposed complicated storing operation of the window W to be simplified, and hence the information processing system 1 is enhanced in facility.

(2) Other embodiments

In the foregoing embodiment, an electrical capacitance tablet is used, but the present invention is not limited to this type of tablet. Other coordinate input means, such as a write pen, a mouse or a pressure sensitive tablet, may instead be used. In these cases, loci which are formed by moving the write pen, mouse or the like provide the input loci.

Furthermore, in the foregoing embodiment, it is stated that the processing mode is switched by detecting turning or reversal in the negative direction of the y axis, but the present invention is not restricted to this. The following detection schemes may instead be used: turning in the positive direction of the y axis; turning in the positive or negative directions of the x axis; and turning in the x and y axis directions. In these cases, the processing mode may be switched also according to the traveling direction.

Also, in the above-mentioned embodiment, it is stated that the processing mode is switched when the travel speed is fast and the locus is turned or reversed to a sufficiently great degree. However, the present invention is not limited to this and the operation mode may be switched only when the locus is sufficiently turned.

In addition, in the embodiment previously described, the detected pen movement leads to the window being stored. Instead, various other processing modes may be switched or selected; for example, the present invention may be applied to a word processor to delete inputted characters.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A hand-written information processing apparatus comprising:
   a) coordinate information input means for inputting coordinate data;
   b) processing means for processing said coordinate data;
   c) detecting means for detecting a trace pattern of said input coordinate data in a sequential manner;
   d) travel speed judging means responsive to said detecting means for judging whether or not the travel speed of said trace pattern satisfies a predetermined condition; and
   e) switching means for switching a mode of said apparatus in response to detection of said trace pattern by said detecting means and to the judgment of said travel speed by said travel speed judging means.

2. An information processing apparatus according to claim 1, in which said detecting means is operable to detect a middle portion of trace information of said trace pattern.

3. An information processing apparatus according to claim 2, in which said middle portion of said trace pattern is a turning point of said trace pattern.

4. An information processing apparatus according to claim 1, in which said coordinate information input means comprises pen means and a tablet.

5. A hand-written information processing apparatus comprising:
   a) pen means for inputting coordinate information;
   b) tablet means for generating coordinate data based on said coordinate information input by said pen means on said tablet means;

c) display means displaying a trace pattern according to said coordinate data, said display means being placed under said tablet means such that an image displayed on said display means is visible through said tablet means; and d) control means for receiving said coordinate data sequentially and processing said coordinate data;

wherein when said control means detects a predetermined trace pattern according to said coordinate data and judges that the travel speed of said trace pattern satisfies a predetermined condition, in response to which the mode of operation of said control means is changed from a first condition to a second condition.

6. An information processing apparatus according to claim 5, in which said mode of said first condition is opening a window on said display means, and said mode of said second condition is closing said window thereon.

7. An information processing apparatus according to claim 6, in which, when said pen means is penned down to a predetermined area of said window, and after that trace pattern of said pen means which is made by tracing said pen means on said tablet means is detected as having a returning point, said control means is operable to close said window.

* * * * *